United States Patent [19]

Sakurai

[11] Patent Number: 4,646,182
[45] Date of Patent: Feb. 24, 1987

[54] CARRIAGE ASSEMBLY FOR A MAGNETIC DISC MEMORY APPARATUS

[75] Inventor: Hiroshi Sakurai, Tokyo, Japan

[73] Assignee: Tokico Ltd., Kanagawa, Japan

[21] Appl. No.: 624,964

[22] Filed: Jun. 26, 1984

[30] Foreign Application Priority Data

Jun. 30, 1983 [JP] Japan .................................. 58-119436

[51] Int. Cl.⁴ ............................................. G11B 5/48
[52] U.S. Cl. ................................... 360/104; 360/98
[58] Field of Search ..................... 360/106, 97–98, 360/105, 109; 384/37, 38, 54, 57

[56] References Cited

U.S. PATENT DOCUMENTS

| | | | |
|---|---|---|---|
| 2,679,437 | 5/1954 | Pusztay | 384/57 |
| 2,833,597 | 5/1958 | Sloyan | 384/38 |
| 3,922,720 | 11/1975 | Caletti et al. | 360/106 |
| 4,323,939 | 4/1982 | Iftikar et al. | 360/106 |
| 4,393,425 | 7/1983 | Wright | 360/105 |
| 4,441,130 | 4/1984 | Boehm | 360/97 |
| 4,528,607 | 7/1985 | Thompson | 360/106 |
| 4,566,738 | 1/1986 | Fasth | 384/37 |

FOREIGN PATENT DOCUMENTS 57-45080 3/1982 Japan .

*Primary Examiner*—John H. Wolff
*Attorney, Agent, or Firm*—Wenderoth, Lind & Ponack

[57] ABSTRACT

A magnetic head of a magnetic disc memory apparatus must accurately translate radially and must be accurately positioned on a desired track of the magnetic disc. The carriage supporting the magnetic head translates along two parallel guide rods through a suitable bearing arrangement. An elastic member is inserted between one of the bearings and the carriage so that the guide rods need not be accurately parallel with each other.

5 Claims, 9 Drawing Figures

CARRIAGE ASSEMBLY FOR A MAGNETIC DISC MEMORY APPARATUS

BACKGROUND OF THE INVENTION

The present invention relates to magnetic disc memory apparatus including at least one magnetic head to read from or write in the corresponding track of a rotating magnetic disc, a carriage carrying said magnetic head, and guide rod means guiding translation of the carriage to position the magnetic head onto a desired track of the magnetic disc.

In a fixed disc memory apparatus or a floppy disc memory apparatus, the read and/or write magnetic head must be accurately positioned on a desired track on the magnetic disc to read from or write in the track. Thus, the carriage which carries the magnetic head is driven by suitable means, e.g. a stepper or pulse motor, to translate radially to the magnetic disc. As the magnetic head must be positioned accurately on the desired track of the magnetic disc, the carriage must translate accurately relative to the disc. When the guide rod means is a pair of parallel guide members, the guide members must be precisely parallel with each other to perform accurte and smooth translation. Further, the two guide members must be precisely similar in dimension. Production of such an arrangement is difficult and necessitates high cost.

SUMMARY OF THE INVENTION

The object of the present invention is to provide a carriage assembly for a magnetic disc memory apparatus which can accurately position the carriage and magnetic head onto a desired track of a corresponding magnetic disc, and which includes a pair of parallel guide members which need not be accurately parallel with each other.

To attain this object, the magnetic disc memory apparatus of the above-mentioned type according to the present invention comprises said guide rod means being a pair of rod shaped parallel guide members, bearing means between said carriage and said guide members so that the carriage is slidably supported by the guide members, and at least one elastic member between said carriage and said bearing means which engages with one of the guide members. Thus, whether or not the guide members are accurately parallel with each other, any deviation is absorbed by elastic deformation of the elastic member.

According to a preferred embodiment of the present invention, when the guide members are circular rods, the distance between the centers of said pair of guide members is less than the distance between the centers of two holes formed in the carriage to accommodate said bearing means so that said elastic member deforms in one of the holes to separate the guide members from each other laterally.

As the carriage is urged to one side surface of each guide member, the clearance between the bearing means and the guide members is absorbed to effect accurate translation.

BRIEF DESCRIPTION OF THE DRAWINGS

The features and advantages of the present invention will become apparent from the description of the preferred embodiment, by way of example, and the accompanying drawings wherein.

DETAILED DESCRIPTION OF PREFERRED EMBODIMENT

Figure 1:
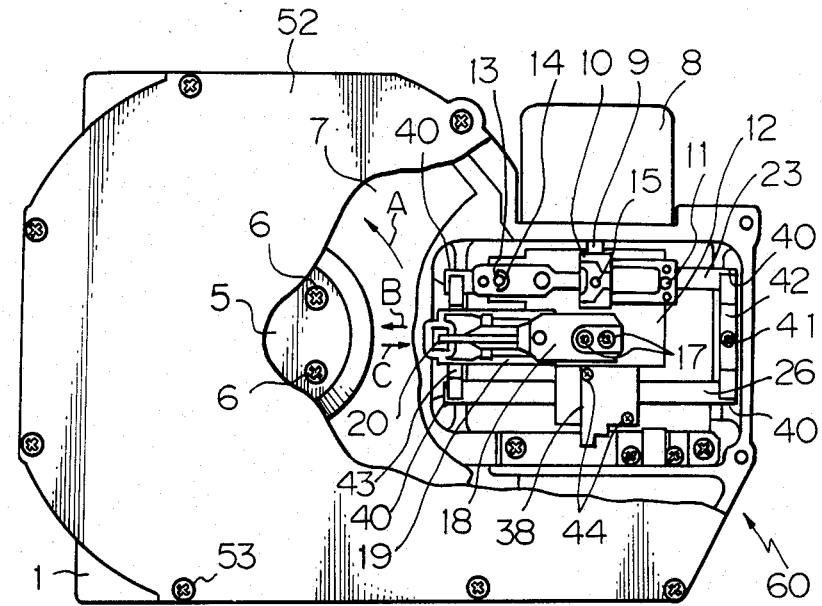
FIG. 1 is a plan view, a portion of which is broken away, of a preferred embodiment of a magnetic disc memory apparatus, according to the present invention.
Figure 2:
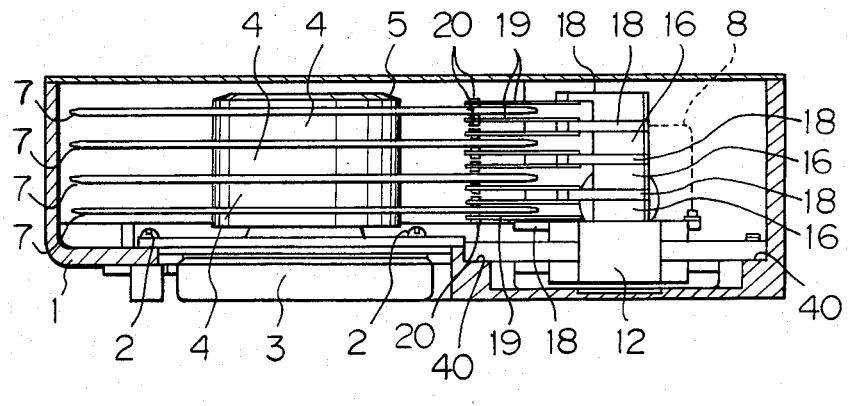
FIG. 2 is a longitudinal sectional view of a apparatus shown in FIG. 1.

Referring to FIGS. 1–4, 1 designates an integrally formed frame to which a spindle motor 3 is mounted by screws 2. To a drive shaft of the motor 3, a plurality of magnetic discs 7 are secured by means of spacers 4, a mounting member 5 and screws 6. The motor 3 rotates the magnetic discs 7 in a given direction, e.g. counter-clockwise, as shown by arrow A.

A stepper motor 8 is mounted on the frame 1 and has an output shaft 9. A steel belt 10 is wound on the output shaft 9. One end of the belt 10 is secured with a carriage 12 by a screw 11, and the other end of the belt 10 has an opening 14 which is engaged with a projection 13 formed on the carriage 12. About half the length of the belt 10 adjacent the one end is separated into two branches as shown, and the other half of the belt 10 adjacent the other end is narrow enough to be accommodated between the two branches. Thus, winding and unwinding of the belt 10 by rotation of the output shaft 9 is smooth and does not cause slipping of the belt. A portion of the belt 10 is secured to the output shaft 9 by a screw 15, to effect positive transmission of rotation of the stepper motor to the translation of the carriage.

When the motor 8 is energized to rotate the output shaft 9, the carriage 12 translates radially to the magnetic discs 7 through the belt 10 as shown by arrows B or C. A plurality of arms 18 are mounted on the carriage 12 by means of spacers 16 and screws 17. On each arm 18 a plate spring formed member 19 is mounted, and a head 20 is mounted on the free end of the member 19. The head 20 records desired data on one or more tracks of a corresponding magnetic disc 7 or reads out recorded data on the tracks of the disc.

Figure 3:
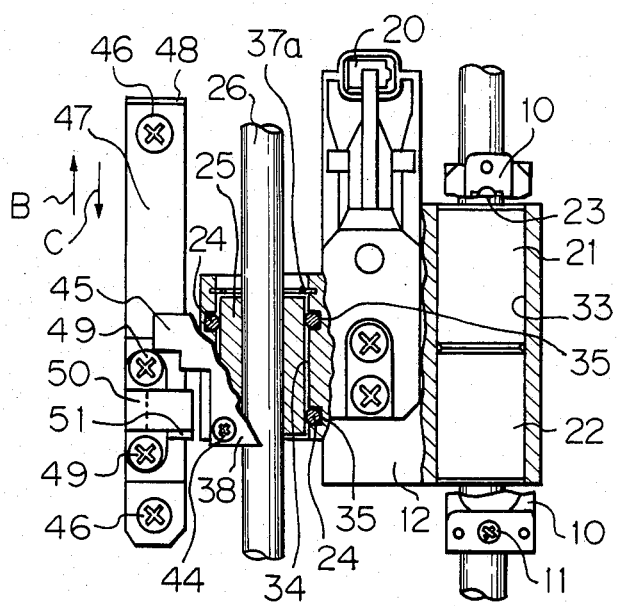
FIG. 3 is an enlarged plan view, a portion of which is broken away, of the carriage and supporting shafts of the apparatus shown in FIG. 1.
Figure 4:
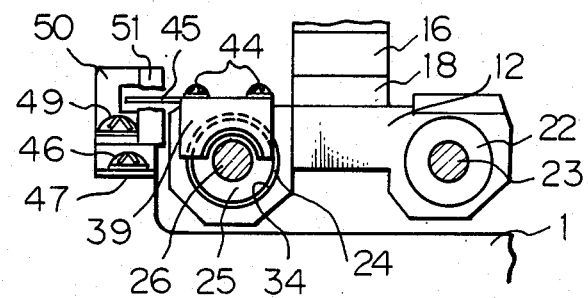
FIG. 4 is a side view of the carriage shown in FIG. 3.
Figure 5:
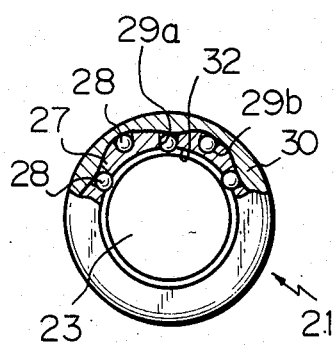
FIGS. 5 and 6 are diagrammatic illustrations of the linear bearing which supports the carriage shown in FIG. 3.
Figure 6:
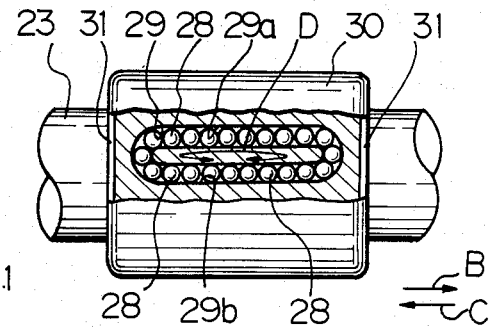

The carriage 12 is slidably supported in the directions B and C, by a round rod shaft 23 through linear bearings 21 and 22, and by a round rod shaft 26 through annular elastic members 24 formed by elastic material, e.g. rubber, and a rigid bearing 25, as shown in FIGS. 3 and 4. The bearings 21 and 22 are similar, and the bearing 21 is shown in FIGS. 5 and 6. As shown, the bearing 21 has an inner retainer ring 27 in which a plurality of elongated circular paths 29 are angularly equally spaced in the circumferential direction of the ring 27. The path 29 extends in the generally axial direction of the ring 27 and encloses many steel balls 28 as shown in FIGS. 5 and 6. Outside the retainer ring 27, an outer ring 30 is fitted to hold the balls 28 in place, and stop rings 31 retain axial movement of the retainer ring 27 from the outer ring 30. As to the balls 28 in the circulating path 29, a plurality of balls 28 in the one linear path 29a project from the inner surface 32 of the retainer ring 27 and roll on the shaft 23 to support the shaft 23 slidably in the directions B and C. The remaining path 29b of the circulating path 29 cooperates with the insie surface of the outer ring 30 and acts as the return path of the balls 28. Thus, when the carriage 12 translates along the shaft 23 in the direction B or C the balls 28 roll on the surface of the shaft 23 and circulate in the circulating path 29. The bearings 21 and 22 fit into a through hole 33 which is formed in the carriage 12.

In another through hole 34 which is formed in the carriage 12, two annular grooves 35 are formed to engage with elastic annular members 24 respectively. A bearing 25 which has a smaller outer diameter than the inner diameter of the through hole 34 is elastically supported through the elastic members 24 by the carriage 12. The bearing 25 slidably engages with the shaft 26. When the free state outer diameter of the elastic member is 2Do, the free state inner diameter thereof is 2do, the inner diameter of the groove 35 is 2Dc, and the outer diameter of the bearing 25 is 2db, deformation $\delta R$ of the elastic member 24 is $\delta R = (Do - do) - (Dc - db)$. The elastic force retaining the bearing is proportional to the deformation $\delta R$.

Figure 7A:
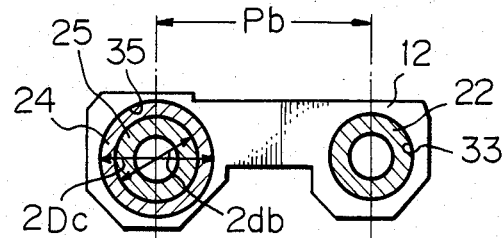
FIGS. 7a, 7b and 7c are illustrations of the carriage, shafts, and elastic members shown in FIGS. 1 and 3, to show relative dimensions thereof.
Figure 7B:
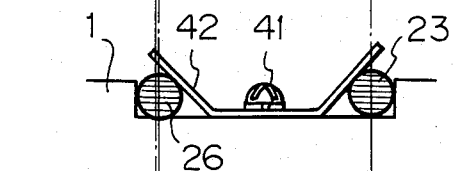
Figure 7C:
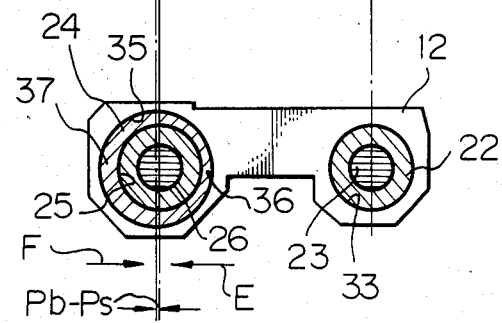

According to the present invention, the distance Ps between the centers of parallel shafts 23 and 26 is smaller than or larger than the distance Pb between the center of through holes 33 and 34. Thus deformation $\delta A$ of the portion 36 of the elastic member 24 is $\delta A = (Do - do) - (Dc = db) \pm (Pb - Ps)$, and the deformation $\delta B$ of the portion 37 which is opposed to the portion 36 is $\delta B = (Do - do) - (Dc - db) \mp (Pb - Ps)$, as shown in FIG. 7c. As shown in FIGS. 7a to 7c, the elastic members 24 urge the bearing 25 in the direction E by a elastic force proportional to the deformation $\delta A$ and urge the bearing 25 in the direction F by an elastic force proportional to the deformation $\delta B$. Thus, the carriage 12 is supported by the shafts 23 and 26 by a lateral urging force which is proportional to $2(Pb - Ps)$. That means the elastic members 24 deform in the through hole 34 to separate the shafts 23 and 26. The bearing 25 is retained in the hole 34 at both ends by a stop ring 37a and a retaining portion 39 of the plate 38 as shown in FIGS. 3 and 4.

Four recesses 40 are formed in the frame 1 and each end of the shafts 23 and 26 is positioned and is urged against the frame 1 at each recess 40 by a locking plate 42 or 43 which is secured to the frame 1 by, for example, a screw 41. The plate 38 is secured to the carriage 12 by screws 44 and integrally forms an abutting portion 45. A plate 47 which is mounted on the frame 1 by screws 46 has an integrally formed vertically extending stopper 48 as shown in FIG. 1. The stopper 48 contacts with the abutting porrion 45 to stop the carriage 12 at the end of the translation of the carriage 12 in the direction B. Another stopper 51, which is mounted on the plate 47 by screws 49, makes contact with the abutting portion 45 to stop the carriage 12 at the end of the translation of the carriage 12 in the direction C.

A detector 50 is mounted on the plate 47 by the screws 49. The detector 50 has a luminous element and a photoelectric transforming element opposed to the luminous element, and adapted to detect disturbance of light rays from the luminous element by the abutting portion 45. Thus, the setting of the initial position of the carriage 12, i.e. setting of the head 20 to the zero track or reference track on the magnetic disc 7, can be easily detected and regulated. A cover 52 is mounted on the frame 1 by screws 53.

In operation of the magnetic disc memory apparatus 60 of the above described construction by energizing of the motor 8, rotation of the output shaft 9 is transmitted through the belt 10 to the carriage 12 which translates along the guide shafts 23 and 26 in the direction B or C. In the translation, the bearing 25 is supported by the elastic members 24 which are elastically deformed between the bearing and the carriage 12. Thus, a least a portion of the shaft 26 contacts with a portion of the bearing 25. Further, when the shafts 23 and 26 are not parallel with each other, the deviation is compensated for by changing of the deformation of the elastic members 24 between the bearing 25 and the carriage 12. Thus, the carriage translates smoothly along the shaft 23. By the translation of the carriage 12, the head or heads 20 are accurately positioned on a desired track on the magnetic disc or discs 7.

The described embodiment is the magnetic disc memory apparatus which has a plurality of magnetic discs 7. However, the present invention can be applied to another magnetic disc memory apparatus having one magnetic disc and also to floppy disc memory apparatus. In place of linear bearings 21 and 22, other rigid bearing means, e.g. bearing 25, may be used to slidably support the carriage on the shaft 23.

It will be appreciated that as the carriage is guided and supported on one of the guide members through elastic members which are urged in one direction, the carriage translates smoothly along the guide members whether or not the two guide members are parallel with each other. Also, as the carriage is urged to one side surface of the guide members by the elastic members, no rattling between the carriage and the guide members is caused, whether the carriage is moving or stopped. Consequently, accurate positioning of the magnetic head or heads onto a desired track or tracks of the magnetic disc or discs is possible.

What is claimed is:

1. A carriage assembly for a magnetic disc memory apparatus including at least one magnetic head to read from or write in a corresponding track of a rotating magnetic disc, a carriage carrying said magnetic head, and guide rod means guiding translation of said carriage to position said magnetic head onto a desired track of the magnetic disc, the improvement comprising:
    said guide rod means being a plurality of rod shaped parallel guide members;
    at least one annular bearing slidably mounted on one of said guide members, said bearing disposed in a through hole in said carriage, said through hole having a diameter which is larger than the outer diameter of said bearing; and
    at least one annular elastic member disposed between said bearing and said through hole in said carriage for elastically supporting said bearing in said carriage.

2. The carriage assembly of claim 1, wherein said guide members are cylindrical rods.

3. The carriage assembly of claim 1, wherein the distance between the centers of said guide members is less than the distance between the centers of said through hole for said one guide member and a second through hole in said carriage for receipt of an other guide member.

4. The carriage assembly of claim 3, wherein a bearing means is disposed in said second through hole and is slidably mounted on said other guide member.

5. The carriage assembly of claim 1, wherein the distance between the centers of said guide members is greater than the distance between the centers of said through hole for said one guide member and a second through hole in said carriage for receipt of an other guide member.

* * * * *